No. 891,115. PATENTED JUNE 16, 1908.
J. L. TUFTS.
METHOD OF PRODUCING SULFUR DIOXID OF COMMERCIALLY UNIFORM TEMPERATURE AND CONCENTRATION.
APPLICATION FILED JULY 29, 1907.
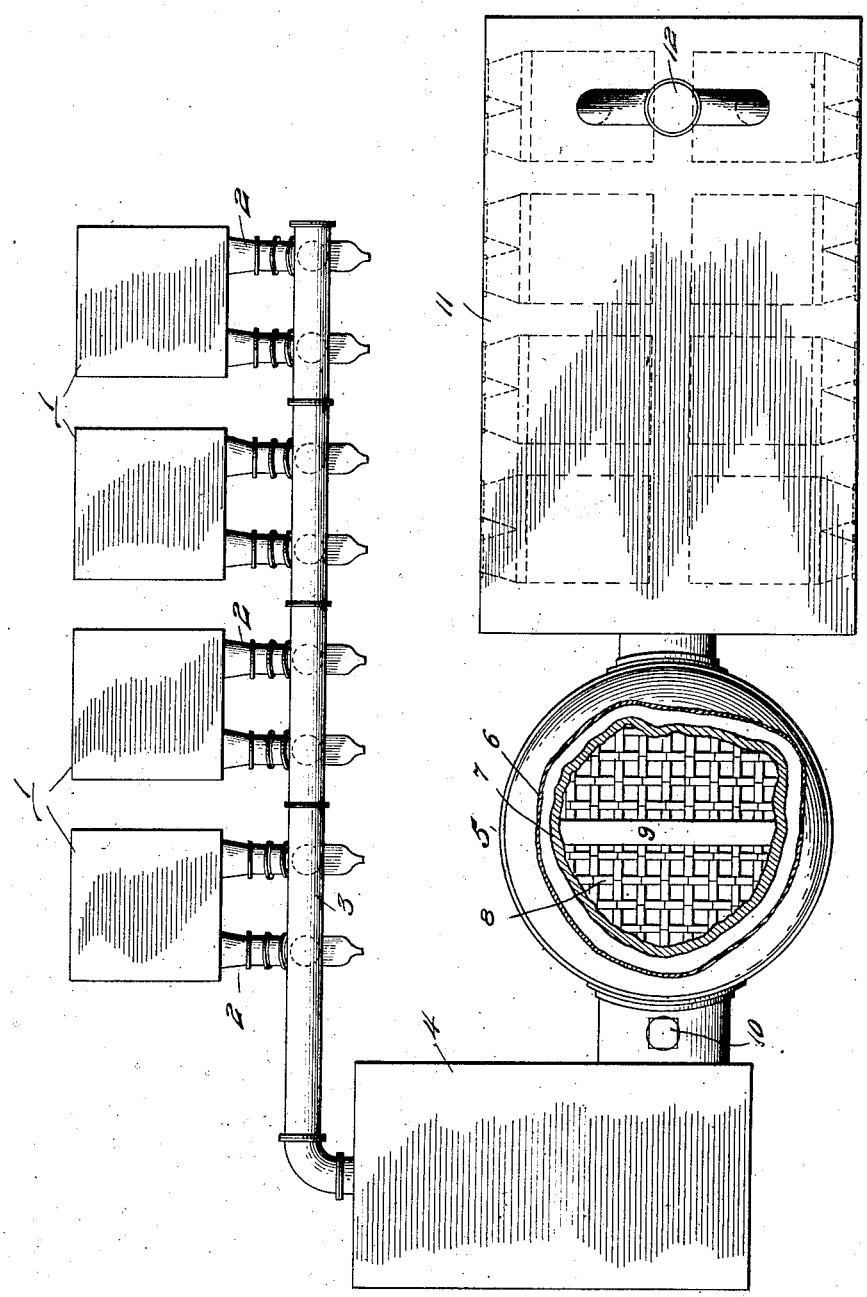
WITNESSES:
INVENTOR.
John L. Tufts,
BY Byrnes & Townsend,
ATTORNEYS

UNITED STATES PATENT OFFICE.

JOHN L. TUFTS, OF BOSTON, MASSACHUSETTS.

METHOD OF PRODUCING SULFUR DIOXID OF COMMERCIALLY UNIFORM TEMPERATURE AND CONCENTRATION.

No. 891,115.        Specification of Letters Patent.        Patented June 16, 1908.

Application filed July 29, 1907. Serial No. 386,159.

*To all whom it may concern:*

Be it known that I, JOHN L. TUFTS, a citizen of the United States, residing at Boston, in the county of Suffolk and State of Massachusetts, have invented certain new and useful Improvements in Methods of Producing Sulfur Dioxid of Commercially Uniform Temperature and Concentration, of which the following is a specification.

The object of this invention is to provide a method whereby dilute sulfur dioxid such as results from pyritic smelting operations or the like may be rendered available for use in various chemical processes, as for instance, in the manufacture of paper pulp by the sulfite process, the production of sulfuric acid, etc. This object is accomplished in the preferred embodiment of the invention by passing the dilute gas rich in oxygen upwardly through a bed of hot ore in suitable pyrites burners, whereby oxygen is consumed and the percentage of sulfur dioxid largely increased. If as is usually the case the dilute gas is subject to wide fluctuations either in respect to concentration of sulfur dioxid or temperature, it is preferred to subject the same to an equalizing operation before enriching it. The initial high temperature of the gas is conserved as far as practicable throughout the treatment.

In order that the invention may be clearly understood the method will be described by way of example as applied to certain specific conditions wherein the gases are subject to wide fluctuations both of concentration and temperature, it being understood that the mode of application of the method will vary with the specific conditions of production of the gas, and with the requirements of the process for its utilization.

Under the specific conditions referred to the dilute sulfur dioxid is derived from a set of pyritic smelters and is subject to a periodical variation of concentration from 2% to 14% by volume of sulfur dioxid, the usual average concentration being approximately 4%. The concentration varies in accordance with the stage of the operation as follows: After the introduction of the fresh charge but before its ignition the concentration of sulfur dioxid is very low, increasing rapidly to the time of full ignition, and then falling as the sulfur is burned out, this variation being repeated for each charge. The percentage of sulfur dioxid varies not only with the stage of the operation but also in accordance with the quantity and composition of the charge, and according to whether the smelters are running hot or cold. The percentage of oxygen varies inversely as the sulfur dioxid, from 19% to 7% by volume. The temperature of the gas varies from 400° to 1,500° F., according to the period of the charge, averaging about 1,000° F. The average interval between maximum and minimum temperature of the gases, and between maximum and minimum concentration of sulfur dioxid, is nine minutes, but varies from four to thirty minutes. In order to render a gaseous product of this character available for commercial uses, it is necessary that it should be subjected to an equalizing operation. In order to render it available for the specific use of the production of sulfuric acid by means of an iron oxid contact mass, in which case the best practice requires a uniform gas containing 6% by volume sulfur dioxid at a uniform temperature of 1,150° F., I may proceed as follows: The gas from the smelters is conducted first through a heavy-walled dust-chamber of masonry surrounded by a shell of sheet-iron, a space being left between the masonry and the iron and filled with a heat insulating material such as kieselguhr. From the dust-chamber the gas is led to an equalizer, which may comprise a thick brick-walled chamber having a heat insulating coating and covered with sheet-iron; preferably the equalizer is provided interiorly with a filling or checker-work of refractory brick, tile or the like. The capacity of the equalizer should be sufficient to hold the gas delivered during an appreciable period, in order to reduce the variation in its composition; and it should furthermore be of such heat capacity and design that the temperature variation can be eliminated to the extent desired. The flue connecting the dust-chamber with the equalizer is provided with a suitably controlled inlet for air, and sufficient air is introduced at the periods of the operation in which the gas is delivered of high concentration to suitably reduce the excess of sulfur dioxid. Preferably the gases are conducted through the apparatus under slight suction, in which case the air may readily be admitted as desired.

The gaseous product flowing from the equalizer is as compared with the gas from the smelters moderately uniform in temperature and concentration; this highly heated gas is introduced into a set of suitable pyrites burners, entering above the grate bars in order to avoid burning them out by reason of the high temperature. These burners are preferably heavy-walled, heat-insulated and sheathed with iron, and of such form as to provide a deep red of cinder above the grate bars, affording distributing space for the gas. In these burners the combustion becomes more intense when the sulfur dioxid is low and the oxygen high and less intense when these conditions are reversed, the result being that the final gas from the burners is of approximately uniform high temperature and concentration, and is suited for direct introduction into an iron oxid contact mass; it is also suitable for direct introduction into a Glover tower and sulfuric acid chambers, or into the sulfite digesters; or after suitable cooling and cleaning for introduction into a platinum contact mass.

For a full understanding of the invention reference is made to the accompanying drawing wherein the figure is a plan view of one form of installation for practicing the method, the upper portion of the equalizer being broken away.

In said drawing 1 represents a group of smelting furnaces for pyritic ores, the gases from which are discharged through flues 2 into a common flue 3 leading to a dust chamber 4.

5 represents the equalizer, having double walls 6, 7 for heat-insulation, and interiorly filled with checker-work 8 on either side of a partition 9.

10 represents an air-inlet located in the gas flue between the dust chamber and the equalizer.

From the equalizer the gases flow directly to the burners represented at 11, and the final gases are conveyed from the burners through the flue 12 for further utilization.

The expression "combustion of sulfur" occurring in the claims is intended to cover the combustion of free sulfur, and also the combustion of combined sulfur in sulfid ores; in the latter case it will be understood that the oxygen combines not only with the sulfur but with the metal of the ore, whereby the gases are heated to a somewhat higher temperature.

I claim:

1. The method of producing sulfur dioxid of commercially uniform temperature and concentration, which consists in first preparing dilute and variable gases containing sulfur dioxid, separating solids therefrom, then equalizing the temperature and concentration of said gases by diluting the same with variable proportions of air, and thereafter utilizing the gases for the combustion of sulfur and thereby equalizing the temperature and increasing the concentration of the same.

2. In a method of producing sulfur dioxid of commercially uniform temperature and concentration, the steps which consist in first preparing dilute and variable gases containing sulfur dioxid, and thereafter utilizing said gases for the combustion of sulfur, and thereby equalizing the temperature and increasing the concentration of the same.

3. In a method of producing sulfur dioxid of commercially uniform temperature and concentration, the steps which consist in first preparing dilute and variable gases containing sulfur dioxid, then subjecting said gases to an equalizing operation, and thereafter utilizing said gases for the combustion of sulfur, and thereby equalizing the temperature and increasing the concentration of the same.

4. The method of producing sulfur dioxid of commercially uniform temperature and concentration, which consists in first preparing dilute and variable gases containing sulfur dioxid, then equalizing the temperature and concentration of said gases by diluting the same with variable proportions of air, and thereafter utilizing the gases for the combustion of sulfur and thereby equalizing the temperature and increasing the concentration of the same.

In testimony whereof, I affix my signature in presence of two witnesses.

JOHN L. TUFTS.

Witnesses:
 EVERETT E. BRAINARD,
 ALBERT C. GILBERT.